United States Patent [19]
Imai et al.

[11] Patent Number: 5,313,441
[45] Date of Patent: May 17, 1994

[54] OPTICAL RECORDING AND REPRODUCING APPARATUS HAVING A PICKUP HEAD INCLUDING A MAIN PRISM WITH REFLECTING SURFACES FOR SPLITTING THE REFLECTED BEAM

[75] Inventors: Hitoshi Imai; Michihiro Tadokoro, both of Amagasaki, Japan

[73] Assignee: Mitsubishi Denki Kabushiki Kaisha, Tokyo, Japan

[21] Appl. No.: 499,640

[22] Filed: Mar. 27, 1990

[30] Foreign Application Priority Data

Apr. 6, 1989 [JP] Japan .................. 1-85763

[51] Int. Cl.⁵ ............................... G11B 7/12
[52] U.S. Cl. .................. 369/44.14; 369/44.12; 369/44.23; 369/44.28; 369/112
[58] Field of Search ............. 369/44.11, 44.12, 44.14, 369/44.23, 44.25, 44.28, 44.32, 44.37, 44.41, 44.42, 103, 105, 106, 112; 359/833, 834, 839, 813, 814, 823, 824

[56] References Cited

U.S. PATENT DOCUMENTS

| | | |
|---|---|---|
| 4,363,961 | 12/1982 | Okada et al. . |
| 4,489,408 | 12/1984 | Verhoeven et al. ............... 369/112 |
| 4,592,627 | 6/1986 | Smid . |
| 4,716,283 | 12/1987 | Ando .............................. 369/112 |
| 4,718,052 | 1/1988 | Kondo et al. ..................... 369/112 |
| 4,730,899 | 3/1988 | Kime et al. ....................... 369/112 |
| 4,835,752 | 3/1989 | Nakatsu et al. ..................... 369/32 |
| 4,841,507 | 6/1989 | Imai et al. . |
| 4,855,987 | 8/1989 | Versluis ........................... 369/112 |
| 5,060,212 | 10/1991 | Fujita et al. ...................... 369/112 |
| 5,095,476 | 3/1992 | Greve et al. ....................... 369/112 |

FOREIGN PATENT DOCUMENTS

6295743  10/1985  Japan .

Primary Examiner—W. R. Young
Assistant Examiner—Muhammad N. Edun
Attorney, Agent, or Firm—Leydig Voit & Mayer

[57] ABSTRACT

An optical recording and reproducing apparatus for optically recording and reproducing information on and from a disk includes a light source for generating a parallel beam. A movable optical system condenses the parallel beam from the light source on the disk, splits the beam into two different beams, and moves in the radial direction of the disk. A split-beam detecting device has two light receiving surfaces which receive part of the two different beams obtained in the movable optical system. A and a control device effects tracking control by moving the movable optical system in the radial direction of the disk in accordance with respective detection signals output from the two light receiving surfaces.

6 Claims, 6 Drawing Sheets

OPTICAL RECORDING AND REPRODUCING APPARATUS HAVING A PICKUP HEAD INCLUDING A MAIN PRISM WITH REFLECTING SURFACES FOR SPLITTING THE REFLECTED BEAM

BACKGROUND OF THE INVENTION

1. Field of the Invention

This invention relates to an optical recording and reproducing apparatus, and in particular to an optical recording and reproducing apparatus using a separate-type optical head which is divided into a stationary optical system and a movable optical system.

2. Description of the Related Art

Figure 5:
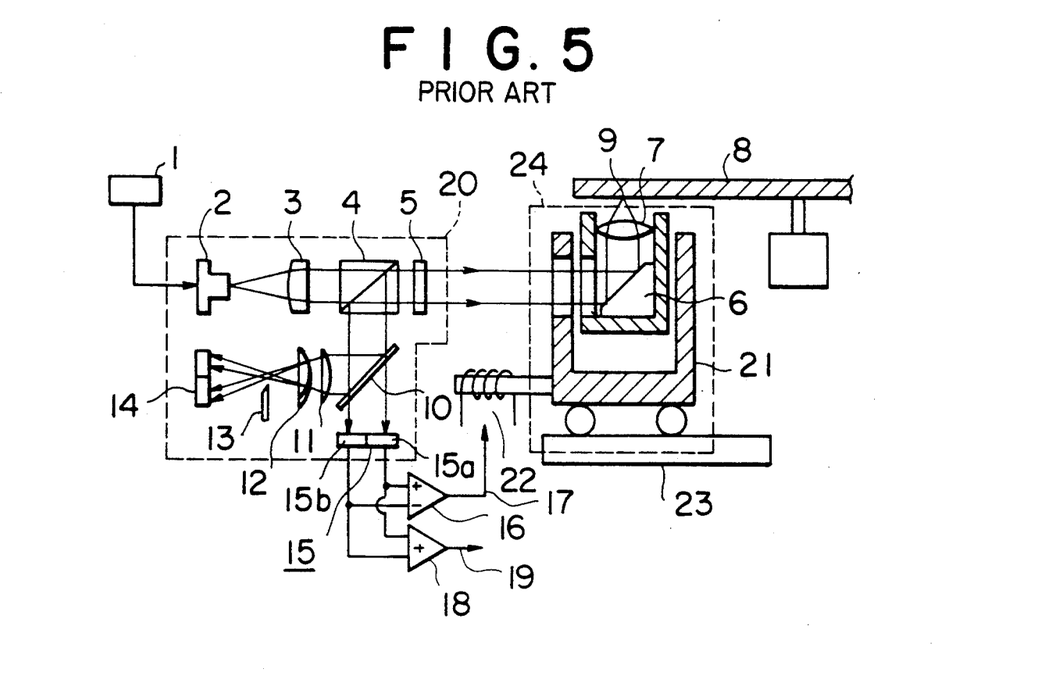
FIG. 5 is a schematic view of a conventional optical recording and reproducing apparatus.

FIG. 5 shows a conventional optical recording and reproducing apparatus which is disclosed in Japanese Laid-Open Patent Application No. 62-95743. The illustrated apparatus comprises a stationary optical system 20 and a movable optical system 24. The stationary optical system 20 includes a semiconductor laser 2, a polarizing beam splitter 4, a quarter-wavelength plate 5, a half mirror 10, a convex lens 11, a cylindrical lens 12, a knife edge 13, and split-beam detectors 14 and 15. The movable optical system 24 includes a lens carriage 21 on which a launching mirror 6 and an objective lens 7 are mounted, an electromagnetic driving means 22, and a rail 23, the lens carriage 21 being moved along the rail 23 by the electromagnetic driving means 22.

Next, the operation of this conventional optical recording and reproducing apparatus will be described. First, the semiconductor laser 2 is driven by means of a power source 1. The semiconductor laser 2 then emits a laser beam, which is converted to a parallel beam by a collimating lens 3. The parallel beam is then transmitted as P-polarized light through the polarizing beam splitter 4, the quarter-wavelength plate 5, and the launching mirror 6 before it reaches the objective lens 7. The beam is then condensed on a disk 8 as a concentrated spot 9 having a diameter of about 1 μm. The beam is then reflected by the disk 8 and is transmitted through the objective lens 7 to become a parallel beam. This parallel beam is reflected by the launching mirror 6 before being transmitted through the quarter-wavelength plate 5. As a result of being transmitted both ways through the quarter-wavelength plate 5, the beam is rotated to S-polarized light and impinges upon the polarizing beam splitter 4, where it is reflected to the half mirror 10. The half mirror 10 divides the beam into two different beams. One of the beams is reflected by the half mirror 10 to a focal-deviation detecting means which is composed of the convex lens 11, the cylindrical lens 12, the knife edge 13, and the split-beam detector 14. Since the principles of operation of this focal-deviation detecting means are not directly related to this invention, a detailed explanation there of will be omitted. It should be added, however, that this focal deviation detecting means may be based on a well-known focus detecting method such as the knife-edge method, image rotation method, Foucault's method, or astigmatism method.

The output of this split-beam detector 14 is converted to a focal-deviation signal by a calculation circuit (not shown). An actuator (not shown) moves the objective lens 7 in the direction of the optical axis, controlling the condensed spot 9 in such a manner that it is constantly kept in focus on the disk 8.

The other beam, which is transmitted through the half mirror 10, is received by the split-beam detector 15, causing a differential circuit 16 to output a track-deviation signal 17. This signal is supplied to the electromagnetic driving means 22, which employs, for example, a well-known voice coil. The electromagnetic driving means 22 then moves the lens carriage 21 along the rail 23 in the radial direction of the disk 8, thereby effecting tracking control.

Figure 6A:
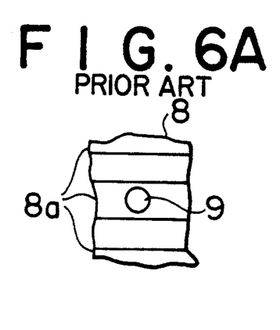
FIGS. 6A to 6D are diagrams showing the positional relationship between disk tracks and the condensed spot.
Figure 6B:
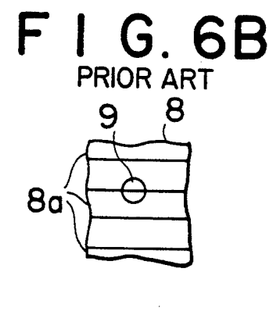
Figure 6C:
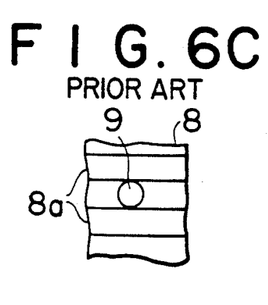
Figure 6D:
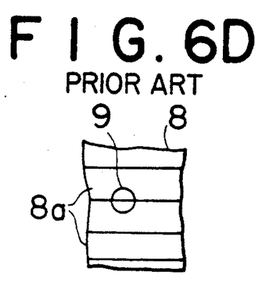
Figure 6E:
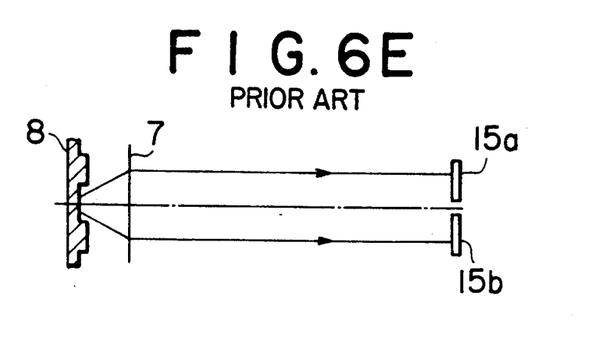
FIGS. 6E to 6H are optical-path diagrams respectively corresponding to FIGS. 6A to 6D.
Figure 6F:
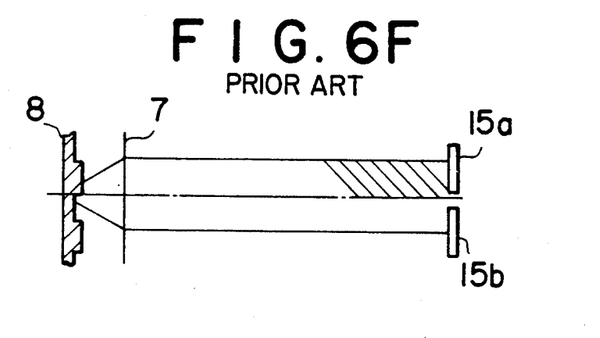
Figure 6G:
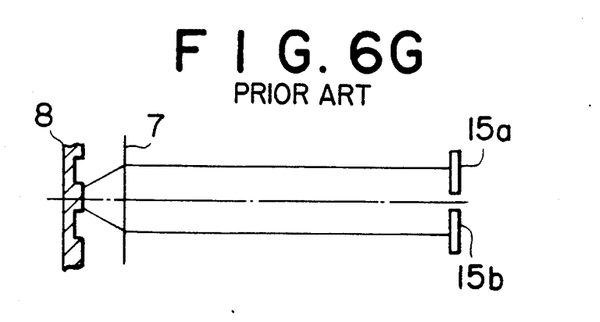
Figure 6H:
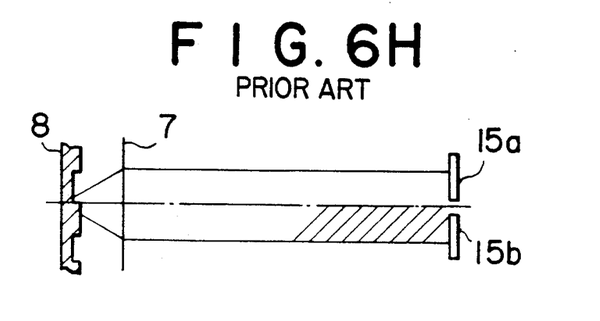

Detection of track deviation will now be described in more detail. If, as shown in FIG. 6A or FIG. 6C, the condensed spot 9 is positioned in the middle of a guide groove (track) 8a or in the middle of an inter-groove section, the quantity of light incident on a light receiving surface 15a is the same as that incident on a light receiving surface 15b, as shown in FIG. 6E or FIG. 6G. However, when the condensed spot 9 deviates to one side of a guide groove, as shown in FIG. 6B, the quantity of light incident on the light receiving surface 15a (indicated by the shaded portion) is less than that incident on the light receiving surface 15b because of the diffraction attributable to the guide groove 8a, as shown in FIG. 6F. When the condensed spot 9 deviates to the other side of a guide groove, as shown in FIG. 6D, the quantity of light incident on the light receiving surface 15b (indicated by the shaded portion) is less than that incident on the light receiving surface 15a, as shown in FIG. 6H. Accordingly, on the basis of a difference in output between the two light receiving surfaces 15a and 15b, it can be detected whether or not the condensed spot 9 is correctly positioned with respect to a guide groove 8a as well as to which side of the guide groove 8a it has deviated. This tracking detection method is generally called the diffraction light method or push-pull method.

However, conventional optical recording and reproducing apparatuses as described above have the following problem. When the movable optical system 24 has been displaced in the vertical direction or when the axis of movement of the rail 23 is not exactly parallel to the optical axis of the parallel beam output from the stationary optical system 20, an offset is generated in the track-deviation signal as the movable optical system 24 moves along the rail 23.

A signal offset is also easily generated if the movable optical system 24 is displaced during its movement due to dust or the like adhering to the rail 23.

Figure 8A:
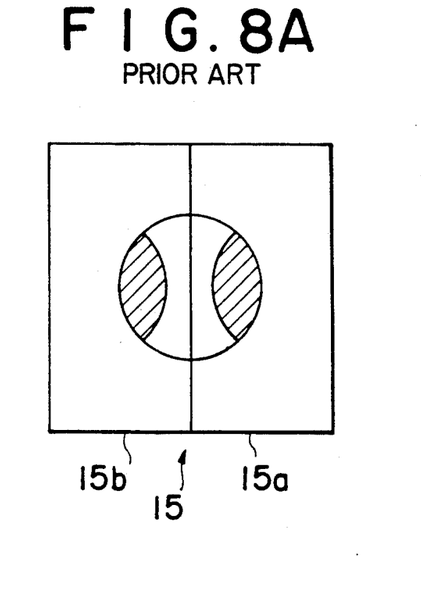
FIGS. 8A and 8B are diagrams showing the manner in which beams are received by the beam detector of the apparatus shown in FIG. 5.
Figure 9A:
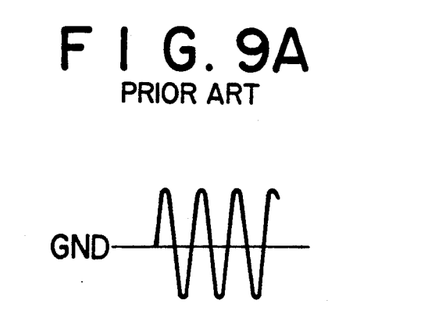
FIGS. 9A and 9B are waveform diagrams showing the track-deviation detecting signal in the apparatus shown in FIG. 5.

This problem will now be discussed with reference to FIGS. 7, 8A, 8B, 9A and 9B. First, when in FIG. 7 the movable optical system 24 is in its initial position indicated by the dashed line, the launching mirror 6 is also in its initial position indicated by the solid line. In this state, the beam incident on the split-beam detector 15 can be indicated by the solid lines. FIG. 8A shows the manner in which beams are received by the split-beam detector 15. The track-deviation detecting signal 17 obtained from the split-beam detector 15 is then set by initialization in such a manner that it exhibits no offset, as shown in FIG. 9A.

Figure 7:
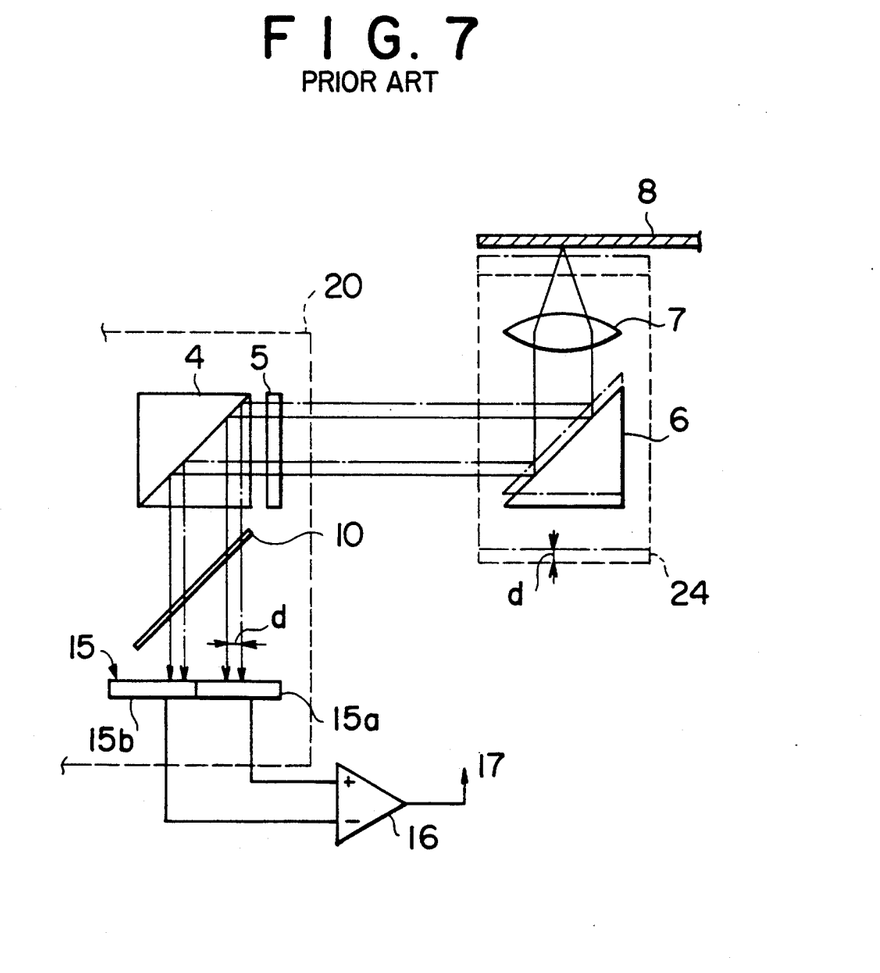
FIG. 7 is an optical-path diagram illustrating the problem in the apparatus of FIG. 5.
Figure 8B:
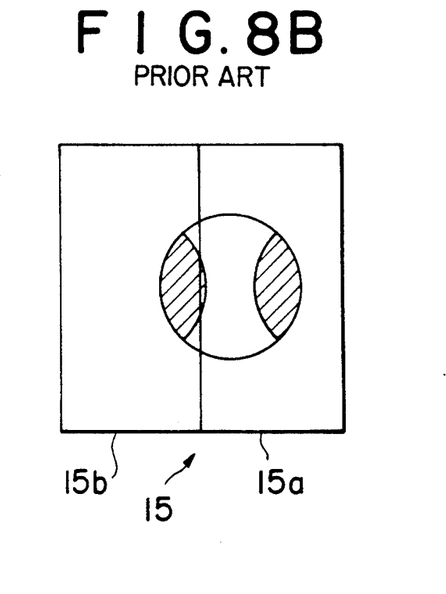
Figure 9B:
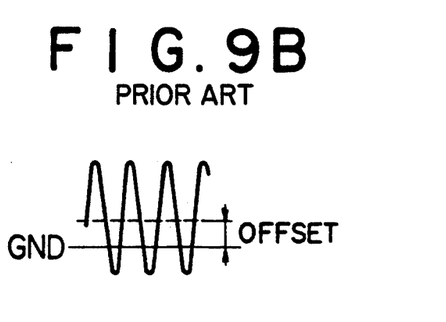

Next, suppose, in FIG. 7, the movable optical system 24 is deviated upwards by a distance d, as indicated by the chain line, while moving along the rail 23. The launching mirror 6 is then also displaced upwards. As a result, the beam reflected by the disk 8 and led to the split-beam detector 15 deviates by the distance d. FIG. 8B shows how the beam is received by the split-beam detector 15 in this condition. Thus, an offset is generated in the track-deviation detection signal 17 as compared to the initial condition, as shown in FIG. 9B.

A similar offset is generated in the track-deviation detection signal 17 obtained from the split-light detector 15 when the movable optical system 24 is tipped. In that case, the beam reflected by the disk 8 and led to the split-beam detector 15 suffers a sideward deviation.

When an offset is thus generated in the track-deviation detection signal 17, the condensed spot 9 on the disk 8 cannot properly follow the guide grooves 8a, resulting in deterioration in the apparatus properties concerned with recording, reproducing, or erasing information.

SUMMARY OF THE INVENTION

This invention has been made with a view towards eliminating the above problem. It is accordingly an object of this invention to provide an optical recording and reproducing apparatus which does not allow an offset to be generated in a track-deviation detection signal even if a movable optical system suffers an optical-axis deviation (a vertical deviation), thereby making it possible to perform stable and accurate tracking control.

In accordance with this invention, there is provided an optical recording and reproducing apparatus for optically recording and reproducing information on and from a disk, comprising: a light source means for generating a parallel beam which is to be reflected by the disk; a movable optical system adapted to condense the parallel beam from the light source means on the disk, split the beam reflected by the disk into two different beams, and move in the radial direction of the disk; a split-beam detecting means having two light receiving surfaces which respectively receive the two different beams obtained in the movable optical system; and a control means adapted to effect tracking control by moving the movable optical system in the radial direction of the disk on the basis of respective detection signals output from the two light receiving surfaces.

DESCRIPTION OF THE PREFERRED EMBODIMENTS

Embodiments of this invention will now be described with reference to the accompanying drawings.

Figure 1:
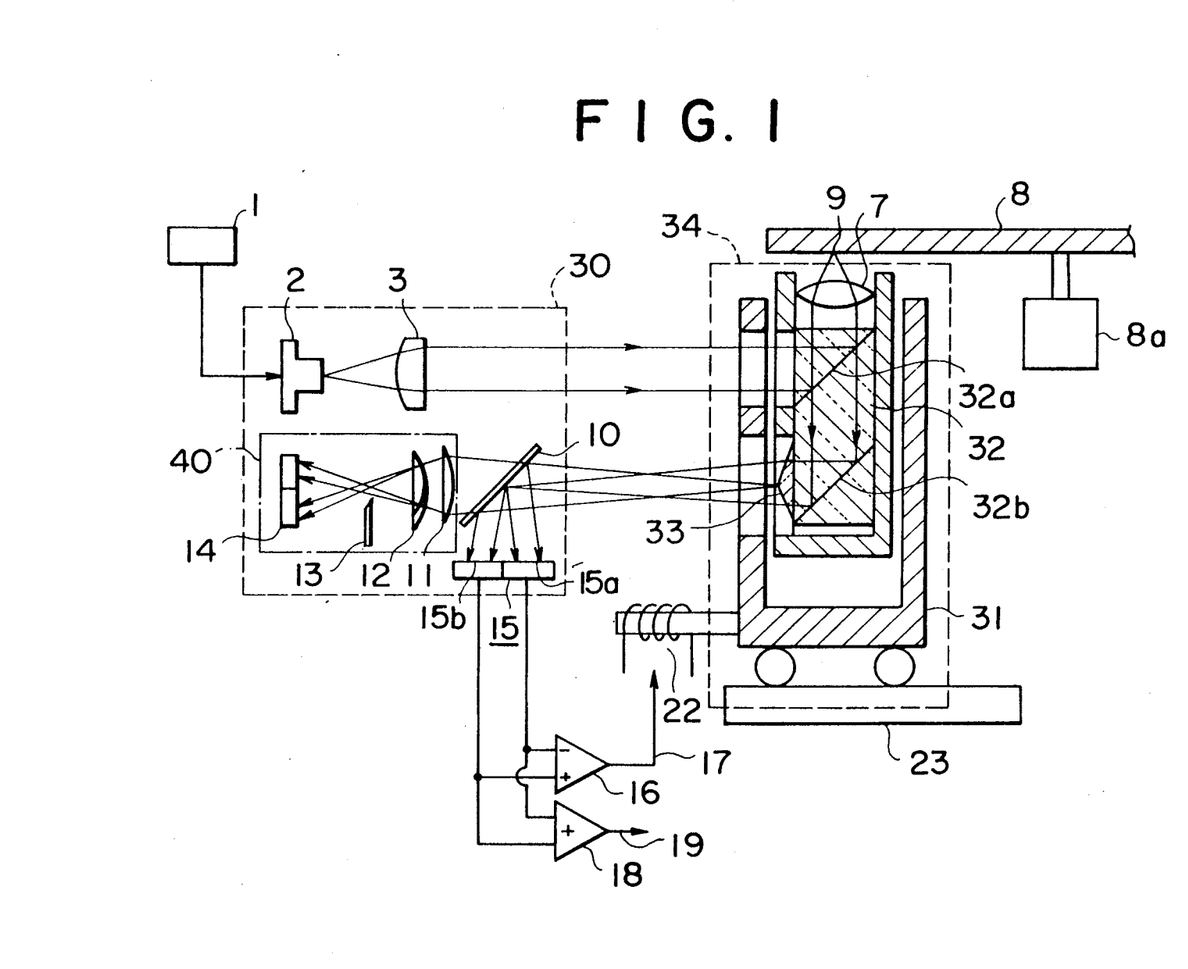
FIG. 1 is a schematic view of an optical recording and reproducing apparatus in accordance with an embodiment of this invention.

In the embodiment shown in FIG. 1, a semiconductor laser 2 is connected to a laser drive power source 1. Light from the laser 2 passes through a collimating lens 3 and is directed at a movable optical system 34. The movable optical system 34 includes a carriage 31 which is movable along a stationary rail 23. Provided on the carriage 31 are an objective lens 7, a main prism 32, and a wedge prism 33. The main prism 32 has a beam split surface 32a and a reflecting surface 32b, which are parallel to each other. The wedge prism 33 is attached to a side surface of the main prism 32. The wedge prism 33 has cross section like an isosceles triangle. The objective lens 7 is provided above the beam splitting surface 32a of the main prism 32. The objective lens 7 faces a disk 8, which is held parallel to the stationary rail 23 and which can be rotated by means of a rotating device 8a. The carriage 31 is equipped with an electromagnetic driving device 22 which serves to move it along the stationary rail 23 in the radial direction of the disk 8.

A half mirror 10, adapted to split the beam from the movable optical system, is arranged in a position where it faces the wedge prism 33 of the movable optical system 34. A split-beam detector 15 equipped with two light receiving surfaces 15a and 15b is provided in the optical path of one of the two beams obtained by the splitting action of the half mirror 10. A differential circuit 16 and an adder 18 are connected in parallel to the light receiving surfaces 15a and 15b, the output 17 of the differential circuit 16 being connected to the electromagnetic driving device 22.

Provided in the optical path of the other beam obtained by the splitting action of the half mirror 10 is a focal-deviation detecting section 40 which is composed of a convex lens 11, a cylindrical lens 12, a knife edge 13, and a split-beam detector 14.

The semiconductor laser 2, the collimating lens 3, the half mirror 10, the split-beam detector 15 and the focal-deviation detecting section 40 form a stationary optical system 30.

The operation of this embodiment will now be described. First, the disk 8 is rotated by the rotating device 8a, and, at the same time, the carriage 31 is moved along the rail 23, causing the objective lens 7 mounted on the carriage 31 to face the disk 8 at a desired position. In this condition, electricity is supplied to the semiconductor laser 2 from the laser drive power source 1, thereby driving the semiconductor laser 2. The semiconductor laser 2 then emits a divergent beam, which is converted to a parallel beam by the collimating lens 3. The parallel beam is reflected upwards by the beam splitting surface 32a of the main prism 32 in the movable optical system 34 and is then transmitted through the objective lens 7 so as to be condensed on the disk 8 as a condensed spot 9 having a diameter of about 1 μm. Recording or reproduction of information on or from the disk 8 is effected through this condensed spot 9.

Reflected by the disk 8, the beam is transmitted through the objective lens 7 again and becomes a parallel beam, which is transmitted through the beam splitting surface 32a of the main prism 32 and reaches the reflecting surface 32b. The beam is then reflected by this reflecting surface 32b and changes its direction before being split into two different beams by the wedge prism 33.

Figure 3A:
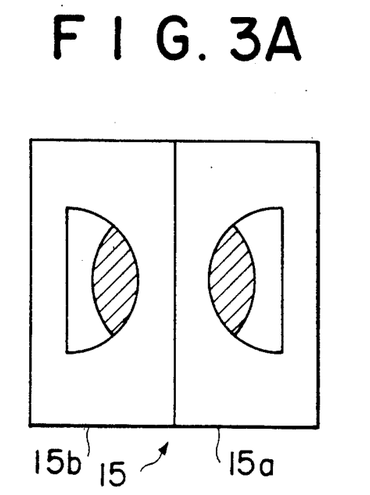
FIGS. 3A and 3B are diagrams illustrating the manner in which beams are received by the beam detector of this embodiment.

The two beams are reflected by the half mirror 10 of the stationary optical system 30 and are led to the split-beam detector 15. Both beams impinge upon the light receiving surfaces 15a and 15b of the split-beam detector 15. FIG. 3A diagrammatically shows how the beams are received by these light receiving surfaces. The difference between the respective detection signals from these light receiving surfaces 15a and 15b is picked up by the differential circuit 16 and is delivered as a detection signal 17. The carriage 31 is moved along the rail 23 by the electromagnetic driving device 22 in such a manner as to cause this detection signal 17 to become 0, thereby effecting tracking control. The tracking control may be performed by moving the objective lens 7 in the radial direction of the disk 8 by means of an actuator (not shown). The detection signals from the light receiving surfaces 15a and 15b are added together by the adder 18 and is delivered as a reproduction signal 19.

Figure 2:
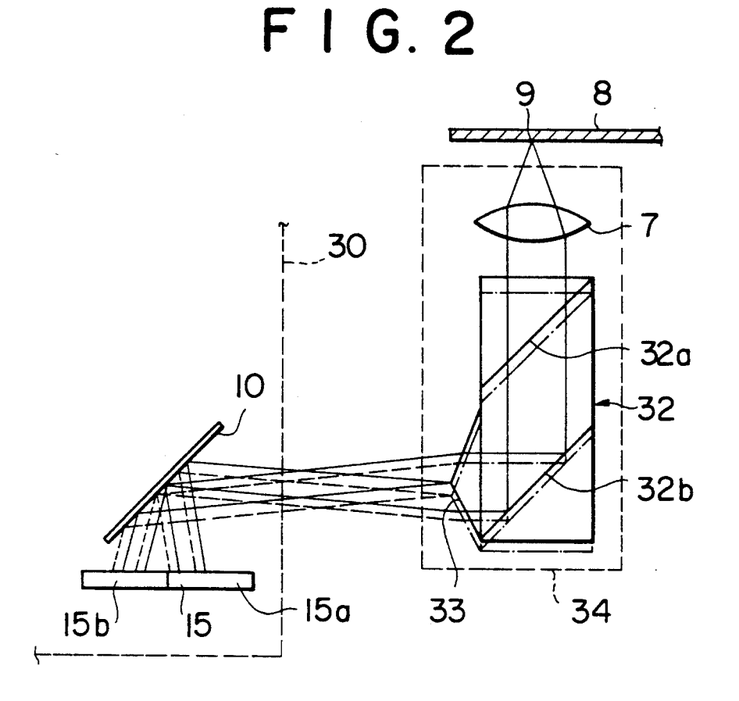
FIG. 2 is an optical-path diagram illustrating the operation of the embodiment of FIG. 1.

Next, with reference to FIG. 2, the case will be where the carriage 31 has been displaced in the vertical direction while moving along the rail 23, that is, the case where the carriage 31 has come nearer to or moved away from the disk 8. Suppose, as indicated by the chain line, the prisms 32 and 33 have been displaced downwards from the normal position together with the carriage 31. Since, as indicated by the dashed lines, the optical paths of the two beams obtained by the splitting action of the wedge prism 33 have also become lower compared to their normal paths (indicated by the solid lines), these beams impinge upon the split-beam detector 15 at positions deviated to the left (as seen in the drawing) after being reflected by the half mirror 10.

Figure 3B:
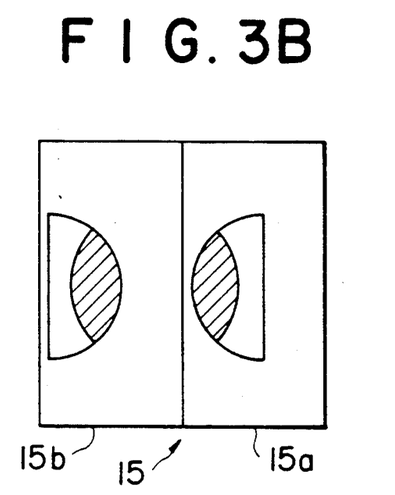

Thus, the beams are received by the beam detector 15 in the manner shown in FIG. 3B. Since, however, the light impinging upon the beam detector 15 has already been split into two by the wedge prism 33, the respective quantities of light incident on the light receiving surfaces 15a and 15b remain the same even if the beams deviate as shown in FIG. 3B. Thus, the deviation in the vertical direction of the carriage 31 does not cause an offset to be generated in the track-deviation detection signal 17 delivered from the differential circuit 16.

Part of the beam obtained by the splitting action of the wedge prism 33 is transmitted through the half mirror 10 and impinges upon the focal-deviation detecting section 40. A focal-deviation detection signal is then obtained by means of the split-beam detector 14. On the basis of this focal-deviation detection signal, the objective lens 7 of the movable optical system 34 is moved in the direction of the optical axis, thereby controlling the condensation spot 9 in such a manner that it is constantly in focus on the disk 8.

Figure 4A:
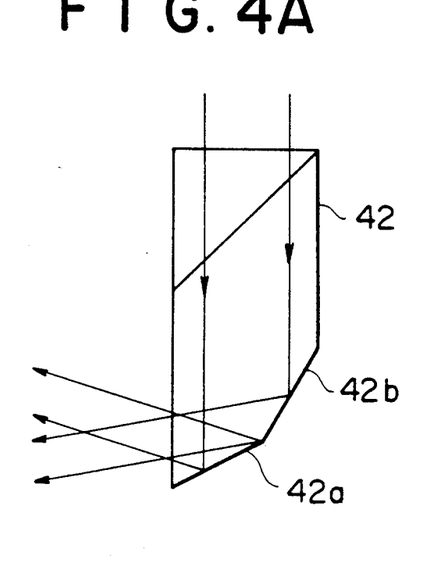
FIGS. 4A and 4B are diagrams showing parts of other embodiments of this invention.
Figure 4B:
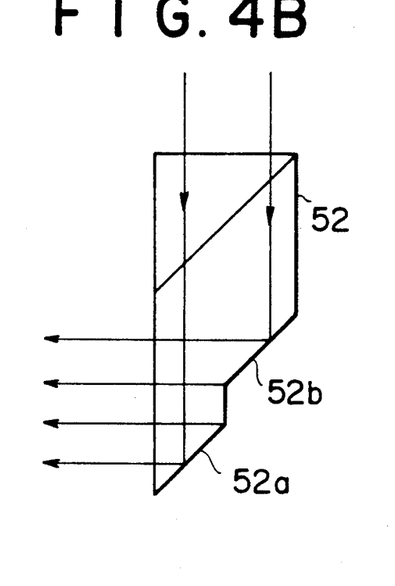

While in the above-described embodiment a beam-splitting action is provided by the wedge prism 33, a similar effect can be obtained by employing a main prism 42 equipped with two reflecting surfaces 42a and 42b which are at a predetermined angle with respect to each other, i.e., are not parallel, as shown in FIG. 4A, or a main prism 52 equipped with two reflecting surfaces 52a and 52b which are parallel to each other and separated by a step formed therebetween, as shown in FIG. 4B.

What is claimed is:

1. An optical recording and reproducing apparatus for optically recording information on and reproducing recorded information from a disk comprising:

light source means for generating a beam of parallel rays;

a movable optical system spaced from the light source means and comprising a stationary rail, a carriage radially movable along the rail relative to a disk, condensing means for condensing the beam of parallel rays from the light source means onto the disk, parallel ray forming means for forming light reflected from the disk into a beam of parallel rays, and splitting means for splitting the beam of parallel rays of light reflected from the disk into two different beams, the condensing means and the parallel ray forming means comprising an objective lens mounted on the carriage facing the disk for forming the beam of parallel rays, the splitting means comprising a prism having a beam splitting surface receiving the beam reflected from the disk, two reflecting surfaces for splitting that part of the beam reflected from the disk transmitted through the beam splitting surface into the two different beams, and a step disposed between and connecting the reflecting surfaces;

split-beam detecting means spaced from the movable optical system and having two light sensing surfaces for receiving the two different beams from the movable optical system and for generating corresponding, respective output signals in response to receiving the two different beams; and control means for controlling tracking by moving the movable optical system in the radial direction relative to the disk in accordance with the respective output signals generated by the two light sensing surfaces.

2. The apparatus as claimed in claim 1 wherein the two reflecting surfaces are parallel to each other.

3. The apparatus as claimed in claim 1 wherein the light source means includes a semiconductor laser emitting a divergent beam and a collimating lens for converting the divergent beam from the semiconductor laser into the beam of parallel rays.

4. The apparatus as claimed in claim 1 wherein the control means includes a differential circuit for sensing the difference between the respective output signals generated by the two light sensing surfaces of the split-beam detecting means and generating a difference output signal in response, and electromagnetic driving means for moving the movable optical system in response to the difference output signal generated by the differential circuit.

5. The apparatus as claimed in claim 1 wherein the split-beam detecting means comprises a first split-beam detector for tracking control, the apparatus further comprising a second split-beam detector for focus control spaced from the first split-beam detector and receiving the first and second beams and focal-deviation detecting means responsive to the second split-beam detector for detecting focal deviation.

6. An optical recording and reproducing apparatus for optically recording information on and reproducing recorded information from a disk comprising:

light source means for generating a beam of parallel rays;

a movable optical system spaced from the light source means and comprising a stationary rail, a carriage radially movable along the rail relative to a disk, condensing means for condensing the beam of parallel rays from the light source means onto the disk, parallel ray forming means for forming light reflected from the disk into a beam of parallel rays, and splitting means for splitting the beam of parallel rays of light reflected from the disk into two different beams, the condensing means and the parallel ray forming means comprising an objective lens mounted on the carriage facing the disk for forming the beam of parallel rays, the splitting means comprising a prism having a beam splitting surface for receiving the beam reflected from the disk and two contiguous, non-parallel reflecting surfaces for splitting a part of the beam reflected from the disk and transmitted through the beam splitting surface into the two different beams;

split-beam detecting means spaced from the movable optical system and having two light sensing surfaces for receiving the two different beams from the movable optical system and for generating corresponding, respective output signals in response to receiving the two different beams; and control means for controlling tracking by moving the movable optical system in the radial direction relative to the disk in accordance with the respective output signals generated by the two light sensing surfaces.

* * * * *